May 17, 1960 W. H. PETERS 2,936,927

HOLDER FOR MILK CARTONS

Filed Aug. 5, 1957

INVENTOR.
WILLIAM H. PETERS
BY
*W. B. Harpman*
ATTORNEY

2,936,927
HOLDER FOR MILK CARTONS

William H. Peters, Youngstown, Ohio

Application August 5, 1957, Serial No. 676,071

1 Claim. (Cl. 220—85)

This invention relates to paper milk cartons and more particularly to a holder for such paper cartons whereby the same may be positioned therein, supported thereby and a handle provided therefor.

The principal object of the invention is the provision of a holder for a paper milk carton so that the same may be conveniently handled.

A futher object of the invention is the provision of a simple inexpensive paperboard holder which may be shipped flat, opened and conveniently positioned on a milk carton.

A still further object of the invention is the provision of a holder for a milk carton of an inexpensive nature and such that it may be used as an advertising device and given away as a promotional item.

The holder for milk cartons disclosed herein comprises a generally rectangular box-like structure which is collapsible and has the front, back and bottom thereof folded longitudinally thereof so that the holder may be folded flat, shipped flat and subsequently opened to rectangular shape for the reception of a milk carton. The holder is provided with a handle on the back thereof and is so arranged that it folds flat and subsequently opens up with the holder to form a firm handle structure.

The holder for milk cartons is preferably formed of paperboard with the vertical corners arranged, like the front and back, for folding on their vertical fold lines.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figures 1, 2, 4:
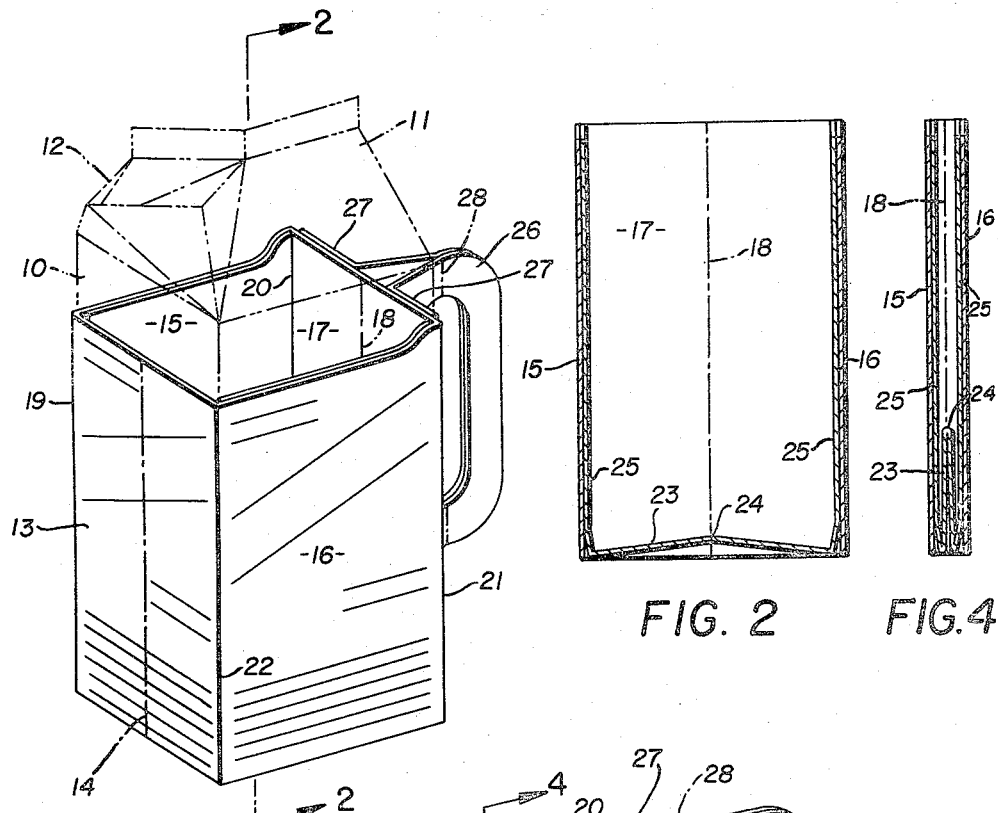
Figure 1 is a perspective view of the holder for milk cartons. Broken lines on Figure 1 illustrate a milk carton.
Figure 2 is a vertical section taken on line 2—2 of Figure 1.
Figure 4 is a vertical section on line 4—4 of Figure 3.

By referring to the drawings and Figure 1 in particular it will be seen that a holder for milk cartons is disclosed together with a broken line representation of a milk carton which is indicated by the numeral 10 with a closed top 11 and an open pouring spout 12.

The milk carton 10 is generally rectangular and is that known in the art which is commonly supplied in one and two quart sizes.

The holder for milk cartons comprises a rectangular body member having a front panel 13 which has a centered vertical fold line 14, oppositely disposed sides 15 and 16 and a back panel 17 having a centered vertically disposed fold line 18. The corners between the panels 13 and 15, 15 and 17, 17 and 16, and 13 and 16 comprise vertical fold lines 19, 20, 21 and 22, respectively. The rectangular hollow shape thus formed is open at the top and bottom but, as may be seen by referring to Figures 2 and 4 of the drawing, has a foldable bottom section 23 having a centered transverse fold line 24.

The sides of the bottom section 23 are upturned as at 25—25 and are secured to the side panels 15 and 16 at points inwardly from the lower ends thereof, as best shown in Figure 2 of the drawing, and extend upwardly therealong to the uppermost edges thereof thereby doubling the side panels 15 and 16.

Figure 3:
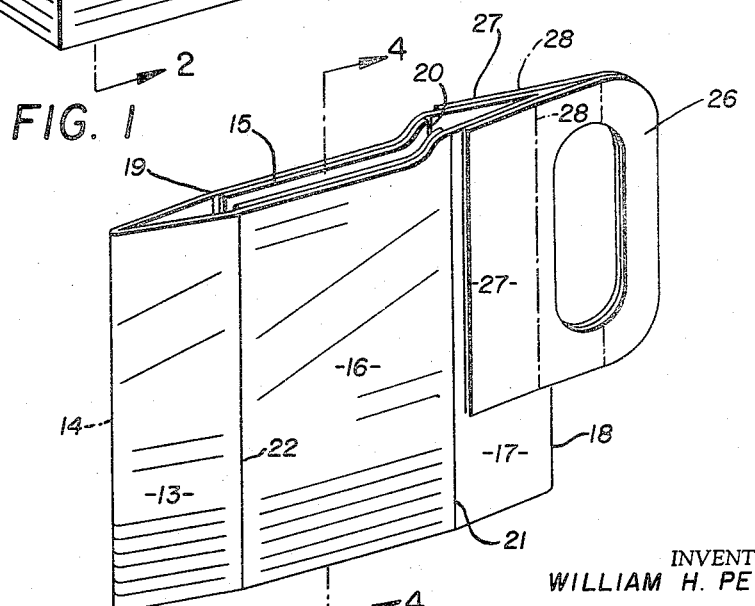
Figure 3 is a perspective view of the holder for milk cartons in flat folded position.

A handle 26 having bifurcated outturned end portions 27—27 is secured to the back panel 17 through the outturned end portions 27—27 which are affixed to the respective halves of the back panel 17 in spaced relation to one another, as best shown in Figures 1 and 3 of the drawing.

It will thus be seen that the holder for milk cartons can be folded flat, as shown in Figure 3 of the drawing, wherein the bottom 23 folds on its transverse fold line 24 and moves upwardly, while the front and back panels 13 and 17 fold on their vertical fold lines 14 and 18 and the outturned ends 27—27 of the handle 26 fold on fold lines 28—28.

The holder for milk cartons may be formed of any suitable material, preferably paperboard, of a suitable strength and thickness which may obviously be provided with desirable indicia or design.

It will occur to those skilled in the art that in addition to holding the paper milk cartons, as hereinbefore described, the holder may also be used to hold half gallon square milk bottles as the construction of the device of the invention is such that it is inherently yieldable and thereby capable of accommodating the half gallon milk bottle.

It will thus be seen that the holder for milk cartons disclosed herein meets the several objects of the invention.

Having thus described my invention, what I claim is:

A holder for milk cartons comprising a cross sectionally square section of tubular paperboard material defining four walls, a U-shaped bottom portion secured to two oppositely disposed walls of said cross sectionally square section of tubular material and extending transversely across one end thereof and having a transverse fold line midway thereof and a handle comprising an apertured section of paperboard material having bifurcated arms, each of which has outturned sections and said outturned sections secured to one of the remaining walls of said cross sectionally square section of tubular paperboard material, the other of said remaining walls and said wall to which said handle is secured being creased longitudinally whereby said cross sectionally square section of tubular paperboard material may be folded flat.

References Cited in the file of this patent

UNITED STATES PATENTS

| | | |
|---|---|---|
| 785,102 | Hougland | Mar. 21, 1905 |
| 1,733,219 | Duvall | Oct. 29, 1929 |
| 2,271,962 | Weiner | Feb. 3, 1942 |
| 2,337,199 | Holy | Dec. 21, 1943 |
| 2,775,373 | Coralline | Dec. 25, 1956 |
| 2,775,382 | Kayat | Dec. 25, 1956 |
| 2,810,503 | Krueger | Oct. 22, 1957 |